(12) United States Patent
Mesibov et al.

(10) Patent No.: US 9,553,420 B1
(45) Date of Patent: Jan. 24, 2017

(54) CURRENT AMPLIFICATION TO IMPROVE OPTICAL AMPLIFIER PERFORMANCE

(71) Applicant: Fujitsu Limited, Kawasaki-shi, Kanagawa (JP)

(72) Inventors: Christopher Mesibov, Airmont, NY (US); Noah Gottfried, Johnsonburg, NJ (US); Idan Mandelbaum, Fair Lawn, NJ (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 14/849,179

(22) Filed: Sep. 9, 2015

(51) Int. Cl.
*H04B 10/06* (2006.01)
*H01S 3/09* (2006.01)
*H01S 3/094* (2006.01)
*H01S 3/067* (2006.01)
*H01S 3/16* (2006.01)
*H04B 10/25* (2013.01)
*H04B 10/69* (2013.01)

(52) U.S. Cl.
CPC ............ *H01S 3/09* (2013.01); *H01S 3/06716* (2013.01); *H01S 3/06754* (2013.01); *H01S 3/094042* (2013.01); *H01S 3/1608* (2013.01); *H04B 10/25* (2013.01); *H04B 10/691* (2013.01)

(58) Field of Classification Search
CPC .... H01S 3/09; H01S 3/06716; H01S 3/06754; H01S 3/094042; H01S 3/1608; H01S 3/094003; H01S 3/06758; H04B 10/25; H04B 10/691
See application file for complete search history.

(56) References Cited

U.S. PATENT DOCUMENTS

| | | | |
|---|---|---|---|
| 6,496,302 B1 * | 12/2002 | Michishita | H01S 3/1301 359/337.1 |
| 6,498,677 B1 * | 12/2002 | Sun | H04B 10/296 359/337.11 |
| 6,738,185 B2 * | 5/2004 | Nakaji | H01S 3/1301 359/341.41 |
| 8,922,879 B2 * | 12/2014 | Tamura | H01S 3/06754 359/341.43 |
| 9,190,801 B2 * | 11/2015 | Itoh | H04B 10/07955 |

* cited by examiner

*Primary Examiner* — M. R. Sedighian
(74) *Attorney, Agent, or Firm* — Baker Botts L.L.P.

(57) ABSTRACT

Methods and systems for current amplification to improve optical amplifier performance may include equalizing a current level indicative of input optical power to an optical amplifier with a current level indicative of an output optical power level of the optical amplifier. In this manner, a first bandwidth of an input log amp may be matched with a second bandwidth of an output log amp in a gain control loop circuit to improve overall transient gain accuracy of the optical amplifier, irrespective of the input optical power. In this manner, the optical amplifier may be enabled to operate at a defined gain level even in the presence of transients in the input signal.

20 Claims, 4 Drawing Sheets

CURRENT AMPLIFICATION TO IMPROVE OPTICAL AMPLIFIER PERFORMANCE

BACKGROUND

Field of the Disclosure

The present disclosure relates generally to optical communication networks and, more particularly, to a system and method for current amplification to improve optical amplifier performance.

Description of the Related Art

Telecommunication, cable television and data communication systems use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, optical switches, couplers, etc. configured to perform various operations within the network.

In particular, optical networks may be reconfigured to transmit different individual channels using, for example, optical add-drop multiplexers (OADMs). In this manner, individual channels (e.g., wavelengths) may be added or dropped at various points along an optical network, enabling a variety of network configurations and topologies. However, such network reconfiguration events may result in power transients among the surviving channels. In particular, steady-state gain offset as a result of network reconfiguration may result in undesired variations in signal power and optical signal to noise ratio (OSNR) in an optical network.

SUMMARY

In one aspect, a disclosed method is for current amplification to improve performance of optical amplifiers. The method may include receiving, in a transmission direction, an optical signal having a plurality of wavelengths, converting the optical signal received to a first current at a first photodetector, converting the first current to a first voltage indicative of the first current, converting the first voltage to a second current greater than the first current, and using the second current to generate an optical pump signal for a doped fiber amplification element. In the method, using the second current to generate the optical pump further includes using a first logarithmic amplifier to generate a second voltage from the second current, and using a second logarithmic amplifier to generate a third voltage from a third current output by a second photodetector coupled to an output of the doped fiber amplification element. In the method, converting the first voltage to the second current further includes equalizing the second current to the third current.

In any of the disclosed embodiments of the method, converting the first current to the first voltage may further include using a transimpedance amplifier to convert the first current to the first voltage. In any of the disclosed embodiments of the method, converting the first voltage to the second current may further include selecting a voltage-to-current conversion ratio to generate the second current. In the method, the voltage-to-current conversion ratio may be selected using a resistor ladder network.

In any of the disclosed embodiments of the method, the second current may enable the first logarithmic amplifier to operate at bandwidth greater than 1 MHz. In any of the disclosed embodiments of the method, the doped fiber amplification element may be erbium doped.

In another aspect, an optical amplifier is disclosed. The optical amplifier includes a doped fiber amplification element to receive, in a transmission direction, an optical signal, a first photodetector at an input to the doped fiber amplification element to generate a first current indicative of the optical signal, a transimpedance amplifier to convert the first current to a first voltage, and a voltage-to-current converter to convert the first voltage to a second current greater than the first current, including equalizing the second current to a third current indicative of an amplified optical signal generated by the doped fiber amplification element. The optical amplifier also includes a gain control circuit to use the second current to generate an optical pump signal for the doped fiber amplification element.

In any of the disclosed embodiments of the optical amplifier, the gain control circuit may further include a first logarithmic amplifier to generate a second voltage from the second current. In the optical amplifier, the second current may enable the first logarithmic amplifier to operate at bandwidth greater than 1 MHz.

In any of the disclosed embodiments of the optical amplifier, the gain control circuit may further include a summing node to sum the second voltage with a third voltage indicative of the third current. In any of the disclosed embodiments of the optical amplifier, the gain control circuit may further include a second photodetector at the amplified optical signal to generate the third current, and a second logarithmic amplifier to generate the third voltage by receiving the third current from the second photodetector. In the optical amplifier, the voltage-to-current converter may enable selection of a voltage-to-current ratio using a resistor ladder network.

In any of the disclosed embodiments of the optical amplifier, the doped fiber amplification element may be erbium doped.

Additional disclosed aspects for current amplification to improve optical amplifier performance include an optical communication system including the optical amplifier, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
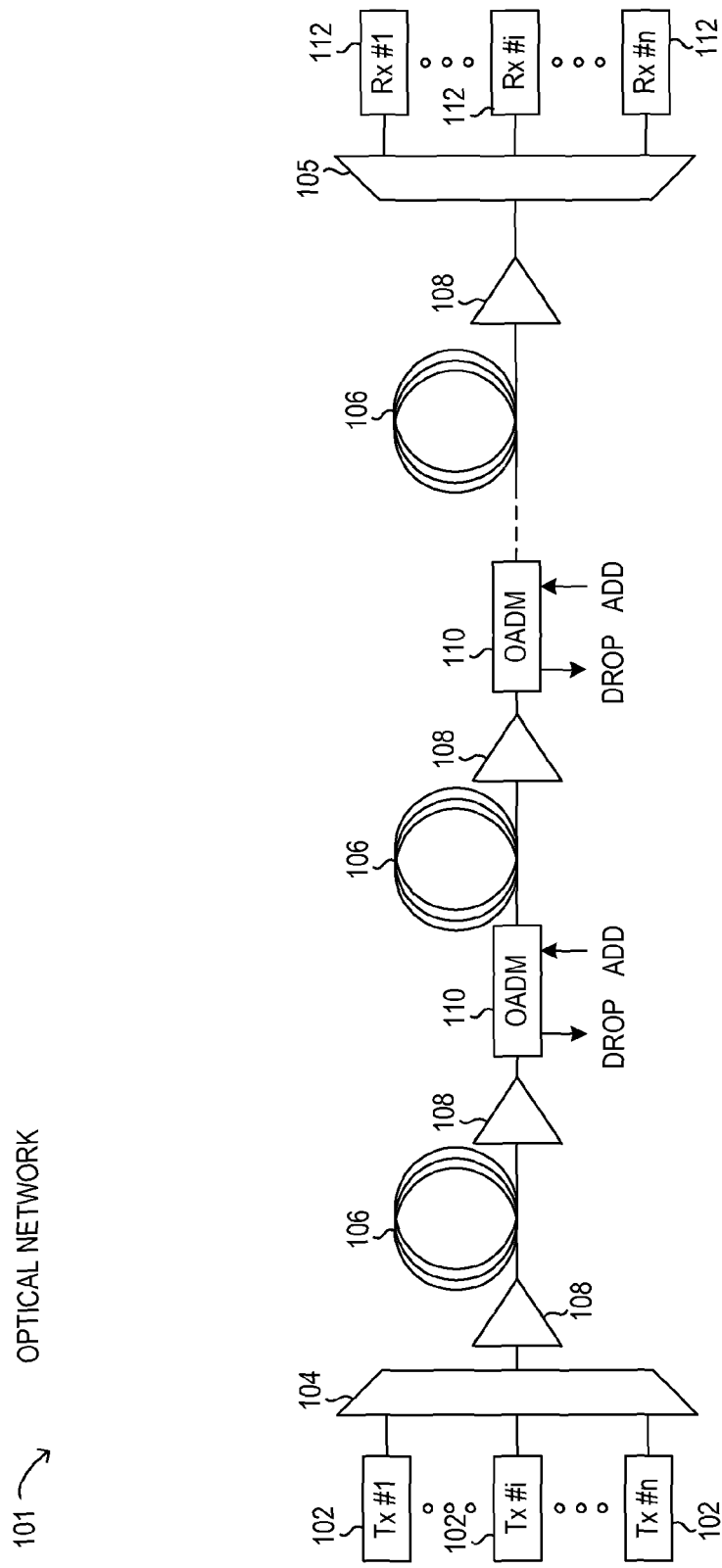
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, reconfiguration of the optical signals to add or drop individual channels may be performed at OADMs 110. Under such add/drop cases, the surviving channels may systematically be subjected to power transients that result in under gain or over gain. The under or over gain of the surviving channels may accumulate rapidly along cascaded optical amplifiers 108 as this transient gain offset may lead to undesirable variation in output signal power and received OSNR. In particular, as higher bit rates, for example up to 100 gigabits per second, are used for transmission over optical network 101, the received OSNR to achieve such higher bit rates may be reduced due to transient gain (TG) effects. In addition to network throughput, variation in OSNR due to transient gain effects may constrain a transmission distance (i.e., reach) of at least certain portions of optical network 101.

In optical network 101, TG effects may be compensated or minimized dynamically using fast loop control, for example, in optical amplifiers 108. However, in typical optical amplifiers, fast loop control may be limited by the bandwidth response of certain components and signal levels. Specifically, the optical amplifier may include respective optical taps at an optical input and at an optical output for measuring input signal levels and output signal levels in order to regulate the gain of the optical amplifier. The optical taps enable a photodetector, such as a photodiode, to generate an electrical signal indicative of the signal level (or optical power level). In a typical optical amplifier, the outputs of the photodetectors are respectively fed directly into a logarithmic amplifier (also referred to as a "log amp") as current signals at the input and at the output of the optical amplifier. Because the optical amplifier generally is used to increase the signal power, the current level at the input log amp may be smaller than the current level at the output log amp. In some cases, such as when transients occur, the current level at the input log amp may be very small and may be substantially below 100 nA. Furthermore, the bandwidth of log amps used in optical amplifiers generally decreases with decreasing input current levels and may thus constrain the overall bandwidth of the optical amplifier gain control loop, because the control speed of a gain control loop in the optical amplifier may be limited by the bandwidth of the log amp used, which is undesirable.

As will be described in further detail herein, the methods and systems disclosed herein for current amplification to improve optical amplifier performance may involve amplifying the current level at an input photodetector to balance input current levels at an input log amp with an output log amp. The methods and systems disclosed herein for current amplification to improve optical amplifier performance may thus enable fast gain control loop speed in the optical amplifier by eliminating or substantially reducing the bandwidth constraint at the input log amp. The methods and systems disclosed herein for current amplification to improve optical amplifier performance may enable the optical amplifier to operate at a defined gain level even in the presence of transients in the input signal.

Figure 2:
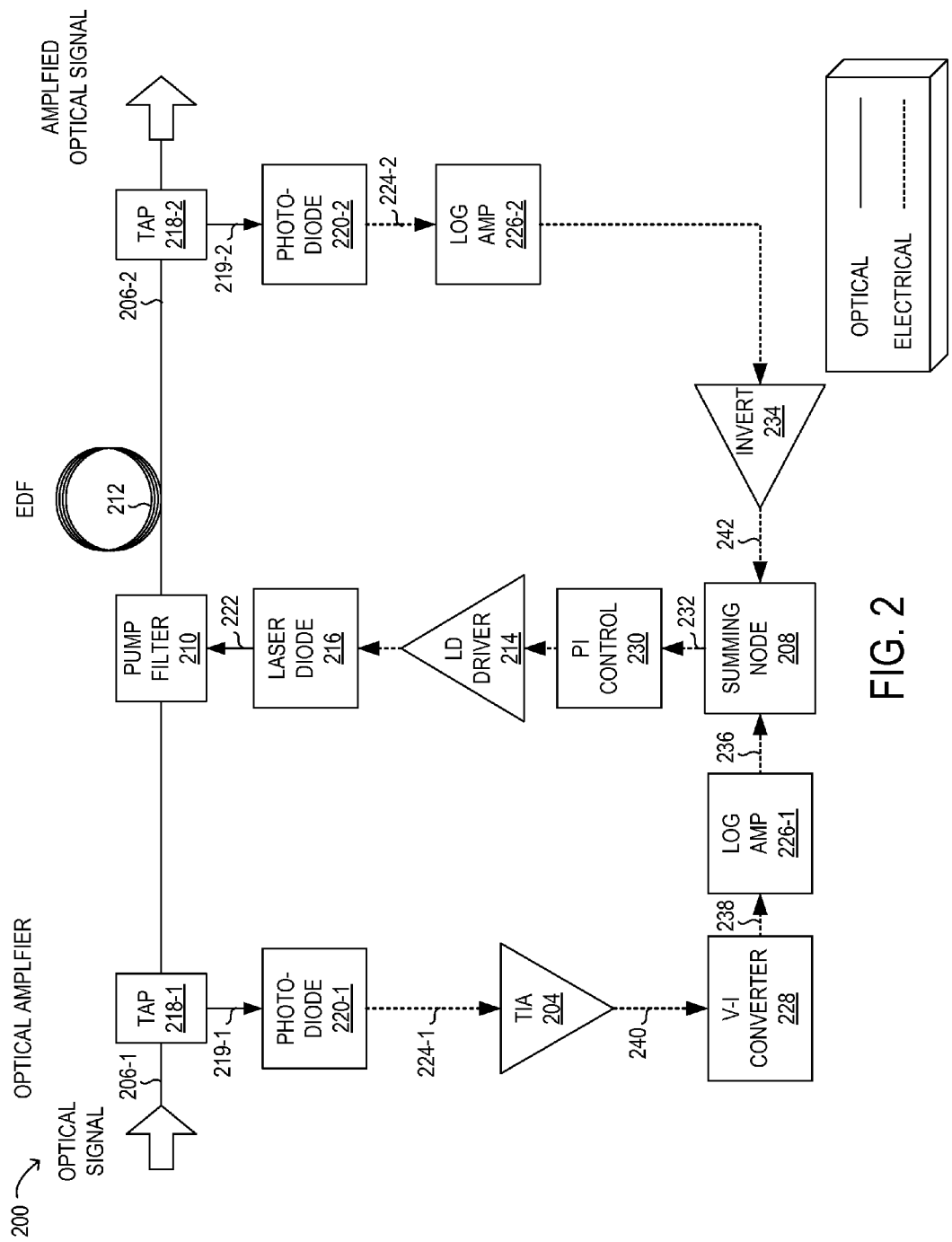
FIG. 2 is a block diagram of selected elements of an embodiment of an optical amplifier.

Turning now to FIG. 2, an example embodiment of optical amplifier 200 employing current amplification to improve optical amplifier performance is illustrated in block diagram format. As shown, optical amplifier 200 may represent an embodiment of optical amplifier 108 (see FIG. 1) and may include a gain control circuit as will now be described in further detail. Accordingly, optical amplifier 200 may receive optical signal 206-1 as input and may output amplified optical signal 206-2. In some embodiments, optical amplifier 200 may be used in optical network 101 after an instance of OADMs 110 is used to add and/or drop channels, which may represent a source of TG in optical signal 206. In FIG. 2, optical amplifier 200 is shown including various optical taps 218, which may represent any of a variety of optical splitters for performing measurements on optical signal 206 at various points within optical amplifier 200, as described herein. As shown in FIG. 2, optical amplifier 200 may represent a device comprising various components and signals between the components, which may include signals in the optical domain (shown connected with a solid line) as well as signals in the electrical domain (shown connected with a dashed line). It is noted that arrows depicted in signal lines in FIG. 2 are intended to show information flow and may not necessarily represent a direction of transmission of a corresponding signal media (e.g., transmission of an optical signal or an electrical current).

In FIG. 2, optical amplifier 200 may include optical tap 218-1 for measuring optical signal 206-1 arriving as an input to optical amplifier 200. Optical signal 219-1 output from optical tap 218-1 may be provided to photodiode 220-1 used as a photodetector. Photodiode 220-1 may output first current 224-1, representing input power of optical signal 206-1, to transimpedance amplifier 204, which may output first voltage 240 to voltage-to-current (V-I) converter 228. V-I converter 228 may be designed to output a second current 238 to log amp 226-1 and may be programmable with regard to a level of second current 238, as described below. Second current 238 may be selected to be greater than first current 224-1 and may be selected to be in a range that does not constrain the bandwidth of log amp 226-1. In various embodiments, the bandwidth of log amp 226-1 may be at least 1 MHz in optical amplifier 200.

Specifically, the current level of second current 238 may be matched to be within a similar range as a third current 224-2, which is referred to as "equalization" of second current 238 with third current 224-2. The current gain may be defined as a ratio of third current 224-2 (indicative of an output of EDF 212) to second current 238. Second current 238 may be programmed by defining or selecting a voltage-to-current conversion ratio at V-I converter 228. In some embodiments, V-I converter 228 may include a bank of resistors that may be selectively switched to form a voltage-to-current conversion circuit element. In given embodiments, V-I converter 228 may include a multiplying digital-to-analog converter (DAC) using an R-2R resistor ladder network to provide selection of the current gain by modifying the current level of second current 238. In this manner, the current gain may be programmable and may be matched to be unity or near unity for current equalization. For example, when an input power of optical signal 206-1 becomes very small very quickly, such as due to a transient event in the optical network, first current 224-1 may accordingly become very small very quickly. However, because log amp 226-1 operates with second current 238, which has been equalized to third current 224-2, the effective bandwidth of log amp 226-1 and log amp 226-2 may be matched to each other and may not limit the overall bandwidth of the gain control loop of optical amplifier 200.

Log amp 226-1 may then generate a second voltage 236 that is linear in decibels (dB) to second current 238. In this manner, second current 238 may be used, in combination with third current 224-2, to determine a pump signal 222 to drive an optical pump for a doped fiber amplification element (shown in the exemplary embodiment of FIG. 2 as erbium-doped fiber (EDF) 212). Specifically, using invert amplifier 234 and summing node 208, control signal 232 is indicative of a difference between second current 238 and third current 224-2. It is noted that in different embodiments, other types of doped fiber amplification elements may be used in place of EDF 212.

Also shown in optical amplifier 200 is optical tap 218-2 at amplified output signal 206-2. Optical signal 219-2 output from optical tap 218-2 may be provided to photodiode 220-2 used as a photodetector. Photodiode 220-2 may output third current 224-2, representing output power of amplified optical signal 206-2, to log amp 226-2, which may output a voltage that is inverted at invert amplifier 234 to generate a third voltage 242 that is linear in dB to third current 224-2.

In FIG. 2, generation of pump signal 222 may be accomplished using summing node 208, which receives second voltage 236 and third voltage 242 and outputs a control signal 232. In some embodiments, control signal 232 is an error voltage that has a non-zero value when pump signal 222 is regulated to a different value. Control signal 232 is output to PI control 230, which may perform a proportional and integral control loop algorithm. PI control 230 sends a regulated output to LD driver 214 that drives laser diode 216 to generate pump signal 222, which is an optical signal. Pump signal 222 may be fed through pump filter 210 before being introduced into EDF 212 to enable amplification of optical signal 206.

In operation of optical amplifier 200 shown in FIG. 2, the gain control circuit described above may maintain a relatively constant power level for the wavelengths in optical signal 206 and may substantially eliminate undesired power variants in optical signal 206. Accordingly, optical amplifier 200 may, for example, limit bit error rate (BER) deterioration in optical networks using ROADMs by instantaneously maintaining relatively constant optical gain at optical amplifier 200.

Figure 3:
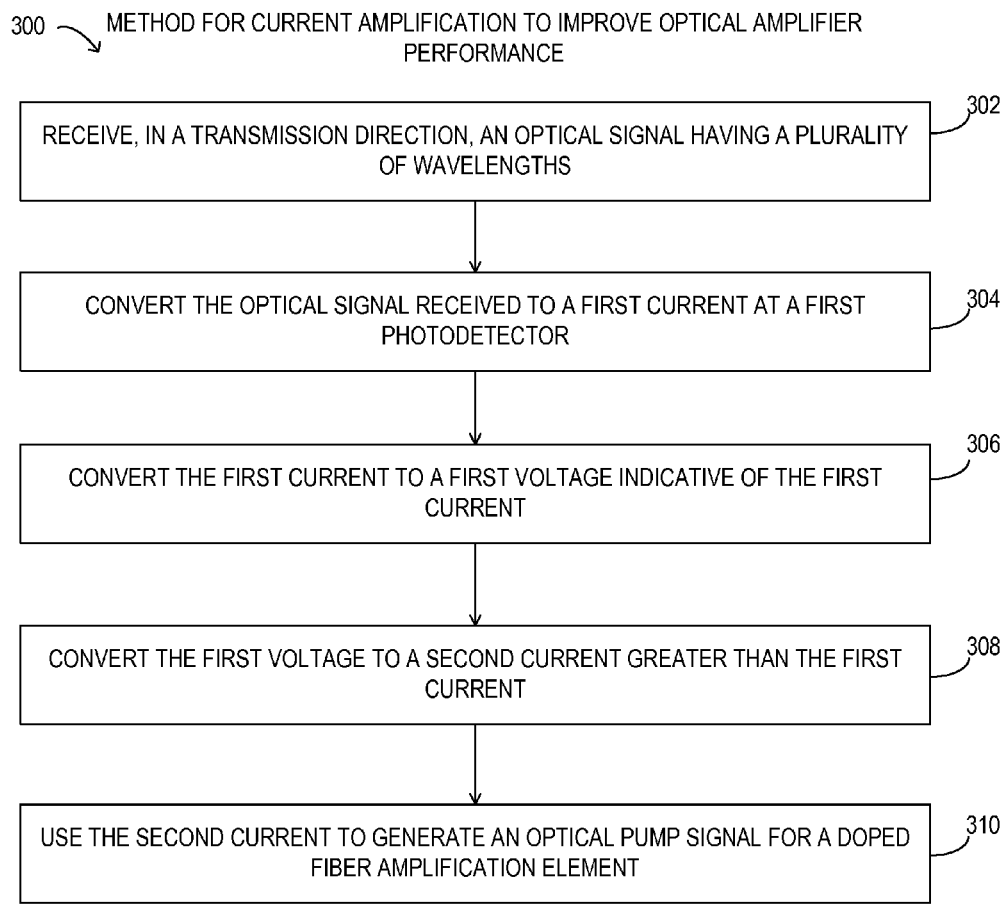
FIG. 3 is a flow diagram of selected elements of an embodiment of a method for current amplification to improve optical amplifier performance.

Referring now to FIG. 3, a block diagram of selected elements of an embodiment of method 300 for current amplification to improve optical amplifier performance is depicted in flowchart form. Method 300 may be performed using network 101 (see FIG. 1) and optical amplifier 200 (see FIG. 2). It is noted that certain operations described in method 300 may be optional or may be rearranged in different embodiments.

Method 300 may begin at step 302 by receiving, in a transmission direction, an optical signal having a plurality of wavelengths. At step 304, the optical signal received may be converted into a first current at a first photodetector. The first current may be indicative of an optical power level of the optical signal received. At step 306, the first current may be converted to a first voltage indicative of the first current. At step 308, the first voltage may be converted to a second current greater than the first current. At step 310, the second current is used to generate an optical pump signal for a doped fiber amplification element.

Figure 4:
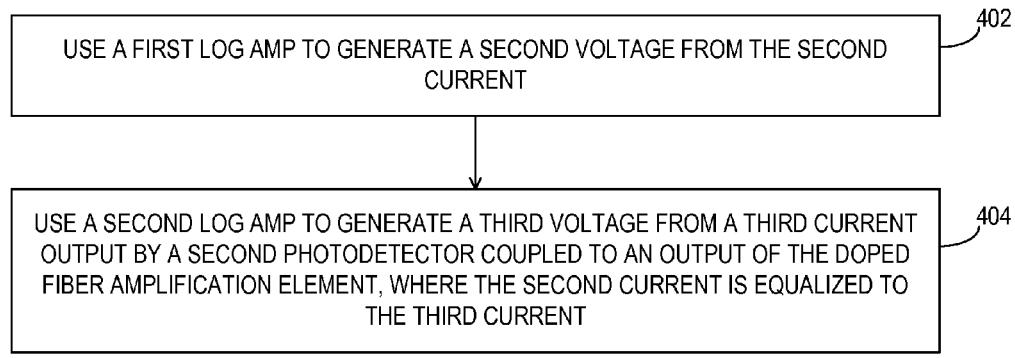
FIG. 4 is a flow diagram of selected elements of an embodiment of a method for current amplification to improve optical amplifier performance.

Referring now to FIG. 4, a block diagram of selected elements of an embodiment of method 310 for current amplification to improve optical amplifier performance is depicted in flowchart form. Method 310 may be performed using network 101 (see FIG. 1) and optical amplifier 200 (see FIG. 2). Method 310 represents an embodiment of step 310 discussed above in FIG. 3. It is noted that certain operations described in method 310 may be optional or may be rearranged in different embodiments.

Method 310 may begin at step 402 by using a first log amp to generate a second voltage form the second current. At step 404, a second log amp may be used to generate a third voltage from a third current output by a second photodetector coupled to an output of the doped fiber amplification element, where the second current is equalized to the third current. The second current may be equalized to the third current at step 308 in method 300 (see FIG. 3). The value of the second current may be selected using a resistor ladder network, such as by V-I converter 228.

As disclosed herein, methods and systems for current amplification to improve optical amplifier performance may include equalizing a current level indicative of input optical power to an optical amplifier with a current level indicative of an output optical power level of the optical amplifier. In this manner, a first bandwidth of an input log amp may be matched with a second bandwidth of an output log amp in a gain control loop circuit to improve overall transient gain accuracy of the optical amplifier, irrespective of the input optical power. In this manner, the optical amplifier may be enabled to perform correctly at a defined gain level even in the presence of transients in the input signal.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for current amplification in optical amplifiers, the method comprising:
   receiving, in a transmission direction, an optical signal having a plurality of wavelengths;
   converting the optical signal received to a first current at a first photodetector;
   converting the first current to a first voltage indicative of the first current;
   converting the first voltage to a second current greater than the first current; and
   using the second current to generate an optical pump signal for a doped fiber amplification element, further comprising:
      using a first logarithmic amplifier to generate a second voltage from the second current; and
      using a second logarithmic amplifier to generate a third voltage from a third current output by a second photodetector coupled to an output of the doped fiber amplification element, wherein converting the first voltage to the second current further comprises equalizing the second current to the third current.

2. The method of claim 1, wherein converting the first current to the first voltage further comprises:
   using a transimpedance amplifier to convert the first current to the first voltage.

3. The method of claim 1, wherein converting the first voltage to the second current further comprises:
   selecting a voltage-to-current conversion ratio to generate the second current.

4. The method of claim 3, wherein the voltage-to-current conversion ratio is selected using a resistor ladder network.

5. The method of claim 1, wherein the second current enables the first logarithmic amplifier to operate at a bandwidth greater than 1 MHz.

6. The method of claim 1, wherein the doped fiber amplification element is erbium doped.

7. An optical amplifier, comprising:
   a doped fiber amplification element to receive, in a transmission direction, an optical signal;
   a first photodetector at an input to the doped fiber amplification element to generate a first current indicative of the optical signal;
   a transimpedance amplifier to convert the first current to a first voltage;
   a voltage-to-current converter to convert the first voltage to a second current greater than the first current, including equalizing the second current to a third current indicative of an amplified optical signal generated by the doped fiber amplification element; and
   a gain control circuit to use the second current to generate an optical pump signal for the doped fiber amplification element.

8. The optical amplifier of claim 7, wherein the gain control circuit further comprises:
   a first logarithmic amplifier to generate a second voltage from the second current.

9. The optical amplifier of claim 8, wherein the second current enables the first logarithmic amplifier to operate at bandwidth greater than 1 MHz.

10. The optical amplifier of claim 8, wherein the gain control circuit further comprises:
    a summing node to sum the second voltage with a third voltage indicative of the third current.

11. The optical amplifier of claim 10, wherein the gain control circuit further comprises:
    a second photodetector at the amplified optical signal to generate the third current; and
    a second logarithmic amplifier to generate the third voltage by receiving the third current from the second photodetector.

12. The optical amplifier of claim 7, wherein the voltage-to-current converter enables selection of a voltage-to-current ratio using a resistor ladder network.

13. The optical amplifier of claim 7, wherein the doped fiber amplification element is erbium doped.

14. An optical communication system comprising:
    an optical amplifier further comprising:
       a doped fiber amplification element to receive, in a transmission direction, an optical signal;
       a first photodetector at an input to the doped fiber amplification element to generate a first current indicative of the optical signal;
       a transimpedance amplifier to convert the first current to a first voltage;
       a voltage-to-current converter to convert the first voltage to a second current greater than the first current, including equalizing the second current to a third current indicative of an amplified optical signal generated by the doped fiber amplification element; and
       a gain control circuit to use the second current to generate an optical pump signal for the doped fiber amplification element.

15. The optical communication system of claim 14, wherein the gain control circuit further comprises:
    a first logarithmic amplifier to generate a second voltage from the second current.

16. The optical communication system of claim 15, wherein the second current enables the first logarithmic amplifier to operate at bandwidth greater than 1 MHz.

17. The optical communication system of claim 15, wherein the gain control circuit further comprises:
    a summing node to sum the second voltage with a third voltage indicative of the third current.

18. The optical communication system of claim 17, wherein the gain control circuit further comprises:

a second photodetector at the amplified optical signal to generate the third current; and a second logarithmic amplifier to generate the third voltage by receiving the third current from the second photodetector.

19. The optical communication system of claim 14, wherein the voltage-to-current converter enables selection of a voltage-to-current ratio using a resistor ladder network.

20. The optical communication system of claim 14, wherein the doped fiber amplification element is erbium doped.

* * * * *